United States Patent
Kotz et al.

(10) Patent No.: US 9,547,912 B2
(45) Date of Patent: Jan. 17, 2017

(54) METHOD FOR MEASURING THE HEIGHT PROFILE OF A VEHICLE PASSING ON A ROAD

(71) Applicant: Kapsch TrafficCom AG, Vienna (AT)

(72) Inventors: Christian Kotz, Vienna (AT); Oliver Rafelsberger, Maria Enzersdorf (AT); Christian Janner, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 223 days.

(21) Appl. No.: 14/158,984

(22) Filed: Jan. 20, 2014

(65) Prior Publication Data

US 2014/0204205 A1  Jul. 24, 2014

(30) Foreign Application Priority Data

Jan. 21, 2013 (EP) .................................... 13152086

(51) Int. Cl.
| | |
|---|---|
| *H04N 7/18* | (2006.01) |
| *H04N 17/00* | (2006.01) |
| *H04N 17/02* | (2006.01) |
| *G06T 7/20* | (2006.01) |
| *G01B 11/06* | (2006.01) |
| *G08G 1/04* | (2006.01) |

(52) U.S. Cl.
CPC ............ *G06T 7/20* (2013.01); *G01B 11/0608* (2013.01); *G08G 1/04* (2013.01); *H04N 7/18* (2013.01)

(58) Field of Classification Search
None
See application file for complete search history.

(56) References Cited

U.S. PATENT DOCUMENTS

| | | | |
|---|---|---|---|
| 6,195,019 B1* | 2/2001 | Nagura ............... | G07B 15/063 235/384 |
| 2002/0140924 A1* | 10/2002 | Wangler ............... | G01S 7/4802 356/28 |

(Continued)

FOREIGN PATENT DOCUMENTS

| | | |
|---|---|---|
| DE | 4332158 A1 | 3/1995 |
| DE | 19517029 A1 | 11/1996 |

(Continued)

OTHER PUBLICATIONS

Ha et al.,"Active Contours and Optical Flow for Automatic Tracking of Flying Vehicles", Proceeding of the 2004 American Control Conference Boston, Massachusetts Jun. 30-Jul. 2, 2004, pp. 3441-3446.

(Continued)

*Primary Examiner* — Hung Dang
(74) *Attorney, Agent, or Firm* — Fiala & Weaver P.L.L.C.

(57) ABSTRACT

A method for measuring a height profile of a vehicle passing on a road, said method comprising the following steps: directing a monocular camera from a point above the road onto the road with an angle of aperture that captures a section of the road from above, recording at least a first image of the passing vehicle by the camera at a first moment in time, recording at least a second image of the passing vehicle by the camera at a second moment in time, generating a movement vector image of the vehicle from an analysis of the optical flow between the first and the second image, and creating the height profile of the vehicle from the movement vector image.

21 Claims, 4 Drawing Sheets

(56) References Cited

U.S. PATENT DOCUMENTS

| | | |
|---|---|---|
| 2004/0008514 A1 | 1/2004 | Lee et al. |
| 2010/0231720 A1* | 9/2010 | Tucker ............... G06K 9/00785 |
| | | 348/149 |
| 2013/0222592 A1* | 8/2013 | Gieseke .................. G08G 1/04 |
| | | 348/148 |

FOREIGN PATENT DOCUMENTS

| | | |
|---|---|---|
| DE | 102009031319 A1 | 1/2011 |
| EP | 2306426 A1 | 4/2011 |

OTHER PUBLICATIONS

Extended European Search Report Received for EP Patent Application No. 13152086.8, mailed on Jul. 3, 2013, 4 pages.

* cited by examiner

METHOD FOR MEASURING THE HEIGHT PROFILE OF A VEHICLE PASSING ON A ROAD

CROSS-REFERENCE TO RELATED APPLICATION(S)

This application claims priority to European Patent Application No. 13 152 086.8, filed on Jan. 21, 2013, the entirety of which is incorporated by reference herein.

BACKGROUND

Technical Field

The present subject matter relates to a method for measuring a height profile of a vehicle passing on a road.

Background Art

The measuring of vehicles as they are travelling is of significance, for example, for height checks of vehicles or for toll road systems, said vehicle having to pay different toll fees depending on the vehicle form, for example vehicle size, body structure (passenger vehicle or lorry), presence of a trailer, number of axles, etc. To this end, a wide range of technologies are currently used, for example laser scanners or stereoscopic (binocular) cameras, in order to create a 3D image of the passing vehicles and to establish therefrom a height profile of the vehicles. Laser scanners are extremely complex however in terms of construction and maintenance, and stereoscopic camera systems require special, complex calibration at all times.

BRIEF SUMMARY

An object of the disclosed subject matter is to create a simpler method for measuring the height profile of a vehicle as it is travelling.

This object is achieved by a method of the type mentioned in the introduction, comprising the following steps:

directing a monocular camera from a point above the road onto the road with an angle of aperture that captures a section of the road from above, recording at least a first image of the passing vehicle by means of the camera at a first moment in time, recording at least a second image of the passing vehicle by means of the camera at a second moment in time, generating a movement vector image of the vehicle from an analysis of the optical flow between the first and the second image, and creating the height profile of the vehicle from the movement vector image.

A first aspect proposes the use of an optical flow analysis on the starting image flow of a monocular camera for the measurement of the height profile of a vehicle on a road. The establishment of 3D images or, more specifically, 2.5D images from the optical flow between chronologically successive images from relative positions that are therefore different is known per se in the art under the slogan "depth from motion" or "shape from video" and utilises the fact that points of an object passing the camera that are close to the camera appear to move more quickly than object points of the same object that are distant from the camera, whereby depth information concerning the object can be obtained.

The basic principles of optical flow analysis are described for example in Antonin Chambolle et al., "An introduction to Total Variation for Image Analysis", Radon Series Comp. Appl. Math 9, 1-78, De Gruyter 2010; John Dainitith, "Optical Flow", 2004, retrieved on 5 Jun. 2012 from encyclopedia.com; Robert Fisher et al., "Dictionary of Computer Vision and Image Processing", John Wiley and Sons, 2005. In traffic monitoring technology, optical flow methods were previously used to examine the movement of traffic flows in separate lanes, for example see Young Cho et al., "Estimating Velocity Fields on a Freeway from Low Resolution Video", IEEE Transactions on Intelligent Transportation Systems, 2006, vol. 7, edition 4, pages 460-469; or Jens Klappstein, "Detektion von bewegten Objekten in Straßenverkehrsszenen mittels des optischen Flusses", (detection of moved objects in road traffic by means of optical flow), dissertation for Ruprecht-Karls-Universität Heidelberg, 2008. Individual vehicles were also followed with the aid of 3D representations of the vehicles at crossroads, said 3D representations being generated by optical flow analysis, for example see Alexander Barth et al., "Vehicle Tracking at Urban Intersections Using Dense Stereo", 3rd Workshop on Behaviour Monitoring and Interpretation, BMI, Ghent, 2009; David Pfeiffer and Uwe Franke, "Efficient Representation of Traffic Scenes by Means of Dynamic Stixels", IEEE Intelligent Vehicles Symposium (IV), pages 217-224, San Diego, USA, 2010; L. Dreschler and H.-H. Nagel, "Volumetric Model and 3D-Trajectory of a Moving Car Derived from Monocular TV-Frame Sequences of a Street Scene", IJCAI'81 Proceedings of the 7th International Joint Conference on Artificial Intelligence, pages 692-697. An overview of traffic applications of optical-flow methods is provided by V. Kastrinaki et al., "A Survey of Video Processing Techniques for Traffic Applications", Image and Vision Computing 21, pages 359-381, 2003.

The method spares costly additional sensors, such as laser scanners, and complex calibration of stereoscopic cameras and makes it possible to implement a height profile measurement of the vehicles with just a single camera directed from above onto the road, which has never been achieved by prior techniques.

The camera may, as an example, be directed substantially vertically downwardly onto the road so as to divide shadowing at the front and rear end faces of the vehicle and to thus minimise such shadowing.

The measured height profile may be both a 2.5D height profile (a 2.5D height profile is understood to be a 3D profile that only contains those pieces of image depth information that are clear from the viewing angle and mounting point of the camera) and a 2D height profile ("sectional image"); for the latter, a 2D height profile running parallel to the longitudinal direction of the road may, as an example, be selected: The analysis of the optical flow as the vehicles move in their direction of travel delivers the most meaningful depth information precisely in this direction.

The optical flow may, as an example, be analysed anisotropically in the longitudinal direction of the road for the same reasons. The edges of the passing vehicles transverse to the longitudinal direction of the road hardly change between the two images (provided a vehicle does not change lanes at this time), and therefore this can be used as a boundary condition in the analysis of the optical flow.

The height profile may, as an example, be scaled on the basis of the speed of the lowest recorded point of the vehicle or of a shadow of the vehicle on the road in order to produce a correctly dimensioned height profile.

Alternatively, a "self-scaling" of the height profiles to the vehicle speed can be achieved in that the moments in time at which the two images to be evaluated by optical flow analysis are captured are made dependent on a detection of the vehicle at predetermined positions on the road. To this end, the first moment in time may, as an example, be the moment in time at which the vehicle is detected in a first position on the road, and the second moment in time is the moment at which the vehicle is detected in a second position on the road.

The vehicle may, as an example, be detected in the first and the second position with the aid of sensors arranged at the road or by means of an evaluation of the images of the camera itself. The mentioned sensors, for example, may be photoelectric sensors, induction loops in the carriageway, scanners or the like. If the images of the camera itself are used for position detection of the vehicles, for example significant points of the vehicle image, such as a corner in the contour of the vehicle, can be detected at predetermined positions in the image.

In further advantageous embodiments, the movement vector image, before the height profile is created therefrom, or the created height profile may, as an example, be compensated by the angle of aperture of the camera and is thus rectified.

Any optical-flow method known in the art can be used for the optical flow analysis. Due to the relatively high relative movement of quick vehicles in the image, a total variation optical flow method may be used, as is described for example in T. Brox and J. Malik, "Large Displacement Optical Flow: Descriptor Matching in Variational Motion Estimation", IEEE Transactions on Pattern Analysis and Machine Intelligence, vol. 33, edition 3, pages 500-513, 2011, obtainable for the Matlab-program libraries, for example at http://lmb.informatik.uni-freiburg.de/resources/binaries/.

The method may also be used to classify the measured vehicle by comparing the created height profile with reference height profiles of known vehicle classes.

For the method, any suitable camera can be used, for example a photo camera for taking successive individual images or a video camera. A traffic monitoring camera mounted on a bridge spanning a road may, as an example, be used as the camera, in particular a traffic monitoring video camera, of which the video stream (image output stream) is fed to the optical flow analysis.

BRIEF DESCRIPTION OF THE DRAWINGS/FIGURES

The present subject matter will be explained in greater detail hereinafter on the basis of an exemplary embodiment illustrated in the accompanying drawings, in which.

Embodiments will now be described with reference to the accompanying drawings.

DETAILED DESCRIPTION

Figure 1A:
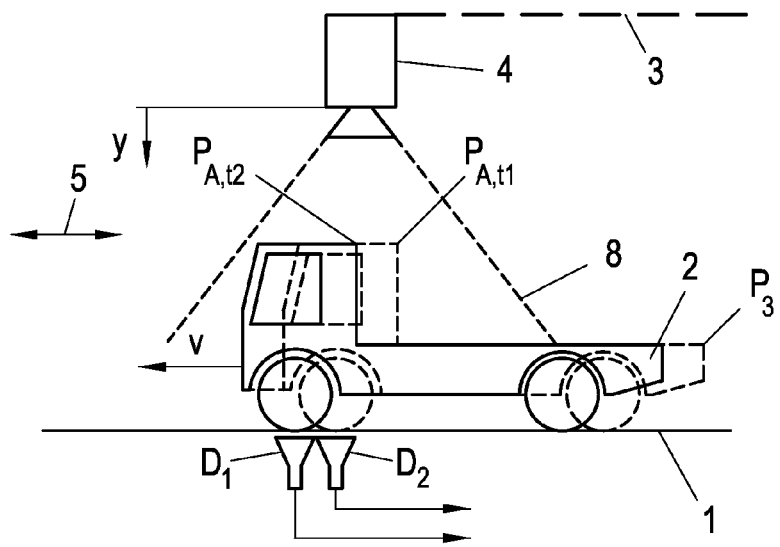
FIGS. 1a and 1b show the method when recording an image of a vehicle passing below a monocular camera at two different moments in time.
Figure 1B:
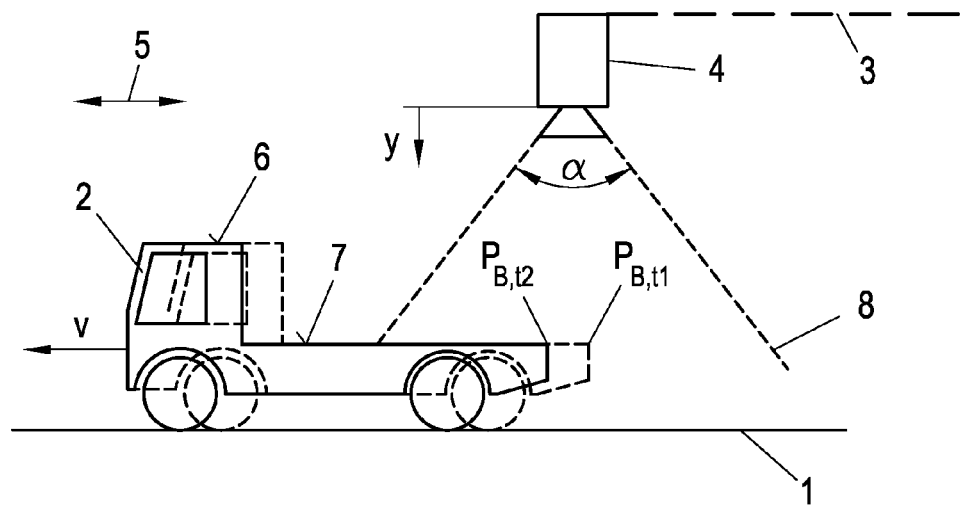

FIGS. 1a and 1b show the basic measuring arrangement for carrying out the method in question for measuring a height profile of a vehicle 2 passing on a road 1. The vehicle 2 is shown in FIGS. 1a and 1b in two different locations or positions, more specifically a first position denoted by dashed lines at the moment in time $t_1$ and a second position shown with solid lines at a later moment in time $t_2$.

A camera 4 directed downwardly onto the road 1 is mounted above the road 1 on a stationary support 3, for example a pole with cantilever arm or a bridge spanning the road (gantry), for example at a mounting height of 6-7 m. The camera 4 is monocular, that it to say it has a single, usually square or rectangular, image recording sensor (not shown) and a single lens arranged in front, whereby it has an inverted-pyramidal field of vision 8 with an angle of aperture $\alpha$ as viewed in a plane parallel to the longitudinal direction of the road 5 and an angle of aperture $\beta$ (not shown) as viewed in a plane transverse to the longitudinal direction of the road 5. For clearer illustration, the vehicle 2 illustrated here by way of example has a very strongly differentiated and simplified height profile with substantially one roof area 6 close to the camera (high) in the form of a driver's cabin roof and one roof area 7 distant from the camera (low) in the form of a loading area.

It goes without saying that the camera 4 may also be directed downwardly at an incline onto the road 1, provided the portion of road of interest, on which the vehicle 2 passes, can be seen in part of the field of vision 8 of said camera.

As can be seen from FIGS. 1a and 1b, a point $P_A$ close to the camera, for example on the roof area 6, moves in a given period of time $\Delta t = t_2 - t_1$ between the first moment in time $t_1$ and the second moment in time $t_2$ in the field of vision 8 of the camera 4 seemingly by a movement vector $x_A$, whereas an image point $P_B$ distant from the camera, for example on the roof area 7, moves in the same period of time $\Delta t$ between the same (or different) moments in time by the smaller movement vector $x_B$.

Figure 2A:
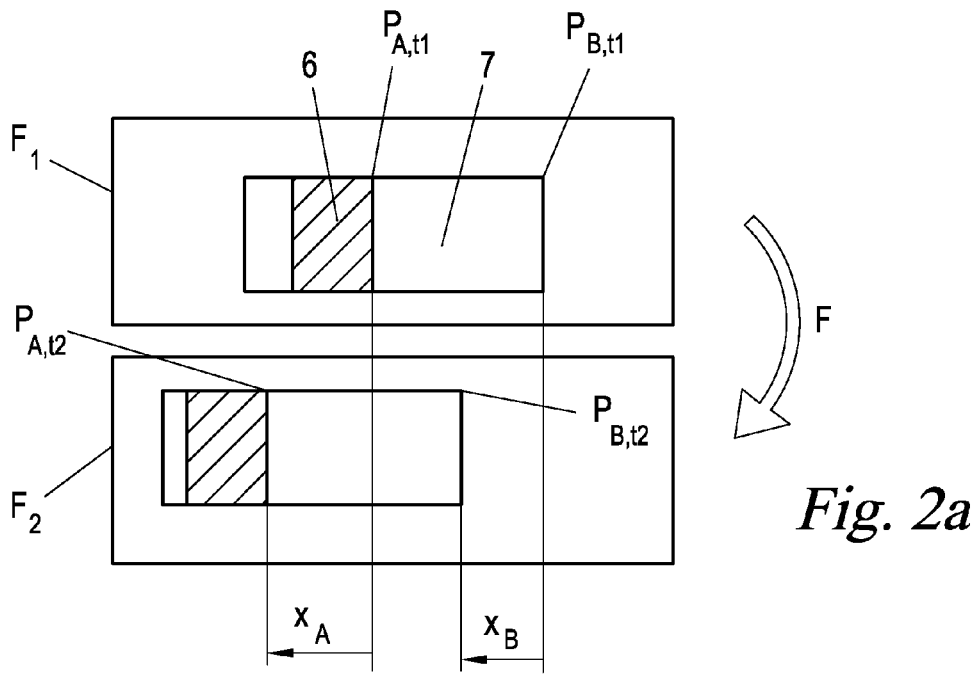
FIGS. 2a-2d show the method on the basis of image, vector and profile data occurring therein.

FIG. 2a shows the recorded images (frames) $F_1$, $F_2$ of the camera 4 corresponding to the recording situations in FIGS. 1a and 1b at the two moments in time $t_1$, $t_2$. The two images $F_1$, $F_2$ are fed to an optical flow analysis method. The optical flow analysis method is known in the art, and, for example, on the basis of significant points (feature points) detected in the images $F_1$, $F_2$, establishes movement vectors $x_A$, $x_B$ of the significant points (sparse approach). Alternatively, all image points could be taken into consideration in that their sought movement vectors are considered as part of an objective function to be minimised, that is to say the movement vector matrix that best reflects the change of the optical flow F between the images $F_1$, $F_2$ is sought (dense approach). Example implementations of the dense approach are the total variation optical flow method, in which the objective function is an energy term to be minimised, which takes into account the changes in brightness and colour between the images. Further terms (of higher order) may also be taken into consideration in order to further improve the results. For details of the optical flow analysis and in particular of the total variation optical flow method, reference is made to the literature mentioned in the introduction T. Brox and J. Malik, "Large Displacement Optical Flow: Descriptor Matching in Variational Motion Estimation", IEEE Transactions on Pattern Analysis and Machine Intelligence, vol. 33, edition 3, pages 500-513, 2011; for example, Matlab-C-mex implementation of this method is available from URL:http://lmb.informatik.uni-freiburg.de/resources/binaries/.

Here, special smoothness terms can be used as boundary conditions for the total variation optical flow analysis, which include the small or absent movement of the vehicle 2 transverse to the longitudinal direction 5 of the road as a precondition in order to facilitate the solution to the minimisation problem. In order to achieve good separation between different objects (road, vehicle) and so as not to smooth the edge between vehicle and road for example, smoothing may, as an example, be carried out anisotropically (parallel to the edges occurring in the images).

Since the movement vectors x(P) for slow vehicles are very small and are zero for stationary vehicles, in these situations the temporal distance $t_2-t_1$ between the two analysed images $F_1$ and $F_2$ may, as an example, be increased. For example, images following on from one another directly from the video stream of the camera 4, when this is a video camera, therefore are not necessarily analysed, but instead images recorded accordingly far apart in time. The recording times $t_1$ and $t_2$ of the two images $F_1$ and $F_2$ may, as an example, be selected such that the vehicle 2 in each case is located in a predetermined position on the road 1, as will be explained later in greater detail. It goes without saying that the camera 4 may also record more than two images $F_1$, $F_2$ at more than two moments in time $t_1$, $t_2$, and these images may be included in the optical flow analysis.

Figure 2B:
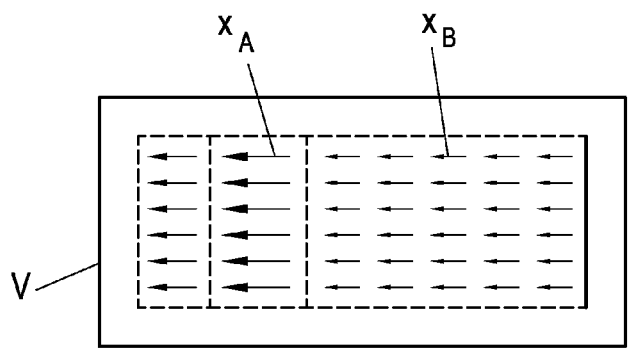

FIG. 2b shows the result of the optical flow analysis of FIG. 2a in the form of a movement vector image V, which contains a movement vector x(P) for each image point P of the camera image $F_1$ or $F_2$. FIG. 2b is a highly schematic drawing with few movement vectors illustrated symbolically; in fact, the movement vector image V is a matrix or an array, in which each cell or pixel P contains a movement vector x(P).

Figure 3A:
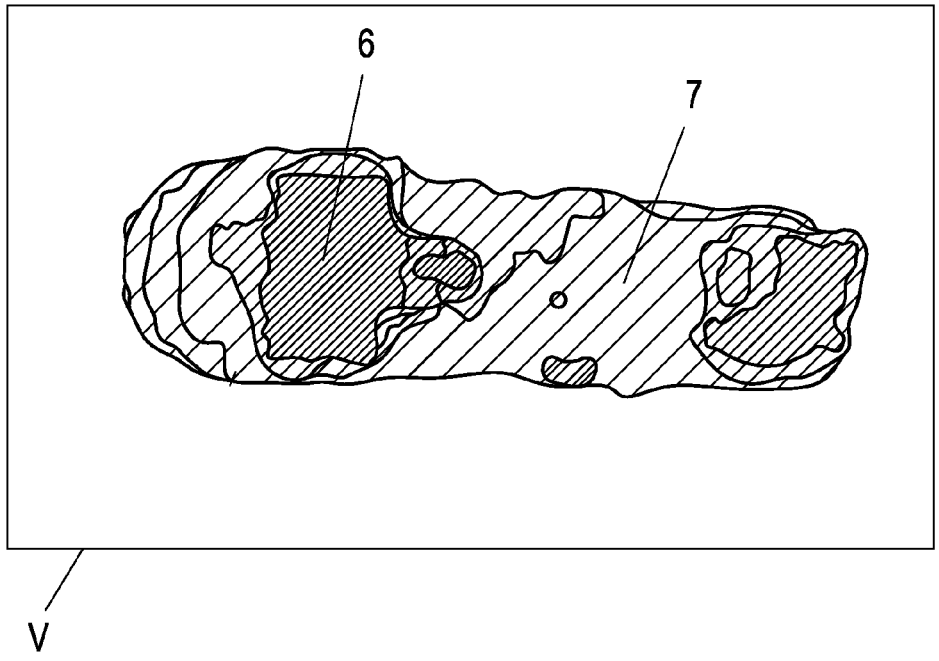
FIGS. 3a and 3B show two exemplary movement vector images before (FIG. 3a) and after (FIG. 3b) rectification.

FIG. 3a shows another form of the illustration of the movement vector image V from FIG. 2b, wherein the absolute values ("speeds") of the movement vectors x(P) have been classified (quantised) in different gradation areas; as can be seen, the roof area 6 (cabin roof) of the vehicle 2 clearly appears with a (seemingly) high speed and the roof area 7 (bay) of the vehicle 2 appears with a (seemingly) low speed.

From the movement vector image V (FIGS. 2b and 3a), the respective distance y (FIGS. 1a, 1b) of a point of the vehicle 2 from the camera 4 can now be established directly: a high absolute value of the movement vector x(P) indicates a short distance y and vice versa. The movement vector image V thus simultaneously constitutes a height relief or height profile of the vehicle 2 passing on the road 1, even if this is "raw" because it is unscaled.

Figure 4:
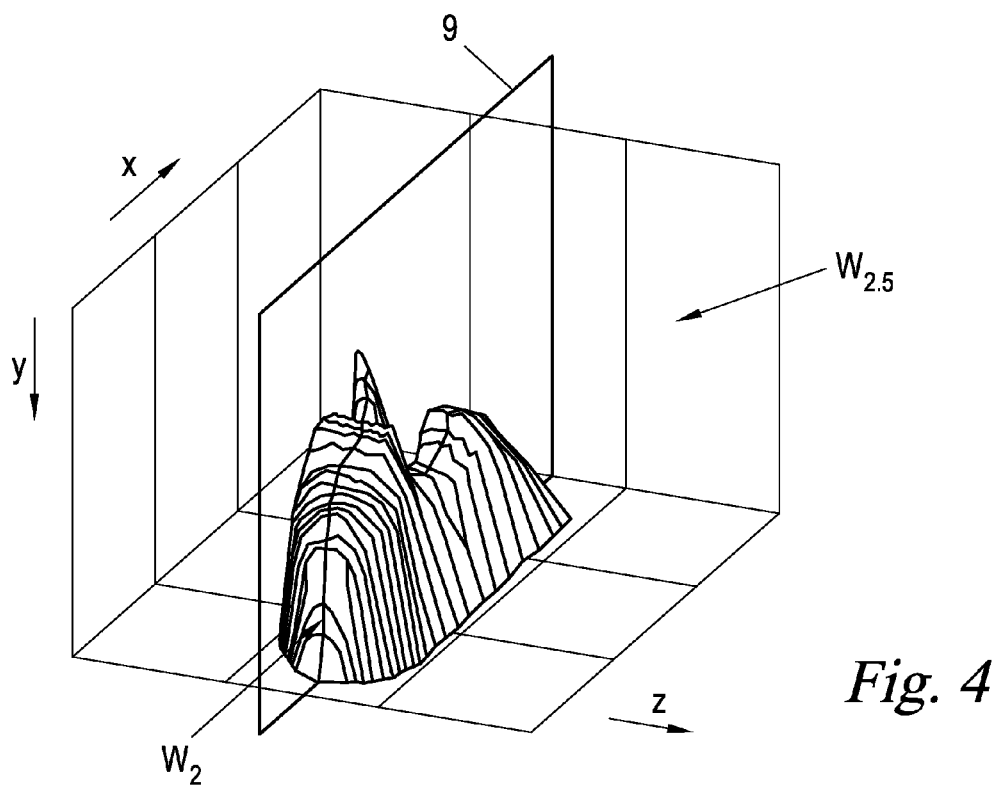
FIG. 4 shows a perspective view of a 2.5D height profile created from the rectified movement vector image from FIG. 3b.

FIG. 4 shows this illustratively in that the absolute values of the movement vectors x(P) of the movement vector image V are assigned distances y and these have been illustrated in a graph. The illustration of FIG. 4 therefore shows a 3D height profile, more specifically: a 2.5D height profile $W_{2.5}$ of the vehicle 2. By creating a section in a plane 9 parallel to the longitudinal direction of the road 5, a 2D height profile $W_2$ can be produced from the 3D or 2.5D height profile $W_{2.5}$ of FIG. 4 and is illustrated in FIG. 5.

Figure 2C:
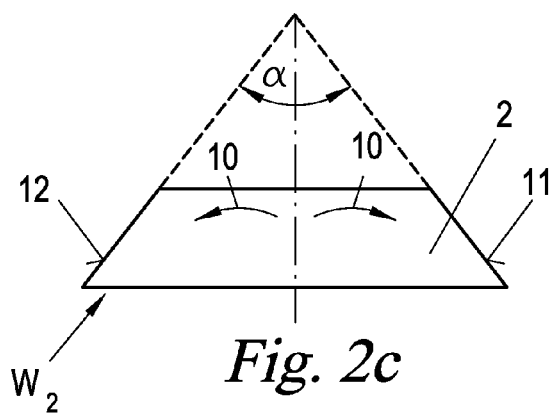
Figure 2D:
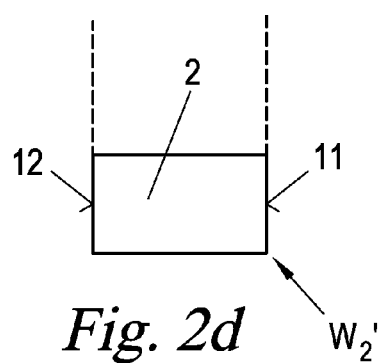
Figure 5:
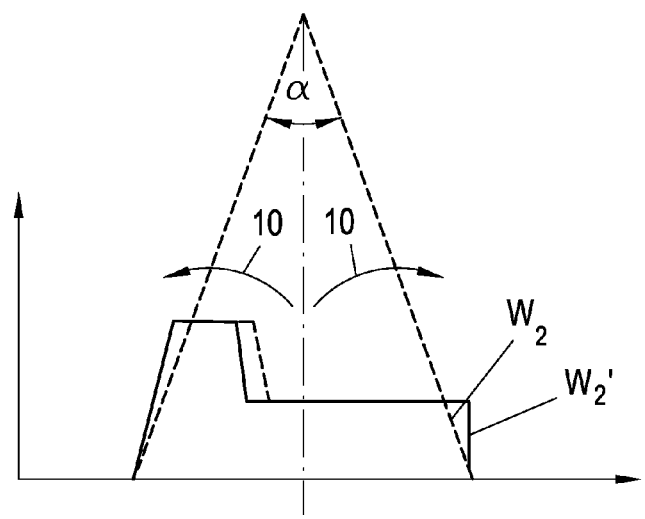
FIG. 5 shows a 2D height profile or the optional subsequent rectification thereof created from the movement vector image of FIG. 3a or 3b or from the 2.5D height profile of FIG. 4 respectively.

It can be seen from FIG. 5 that the height profile $W_{2.5}$ or $W_2$ considered until now is distorted in accordance with the angle of aperture α of the camera 4 in the longitudinal direction of the road 5 (and also in accordance with the angle of aperture β transverse thereto). With the aid of a corresponding geometric equalisation, the 2D height profile $W_2$ of FIG. 5 (or the 2.5D height profile $W_{2.5}$) of FIG. 4 can thus be compensated by the angle of aperture α (and optionally also β) of the camera 4, that is to say rectified, as illustrated schematically by the arrows 10 in FIG. 5; the rectified 2D height profile is denoted in FIG. 5 by $W_2$'. FIGS. 2c and 2d schematically show in detail the step of rectification of a 2D height profile $W_2$ by the angle of aperture α in the longitudinal direction of the road 5 on the basis of a box-shaped vehicle 2 with vertical end faces 11, 12.

Figure 3B:
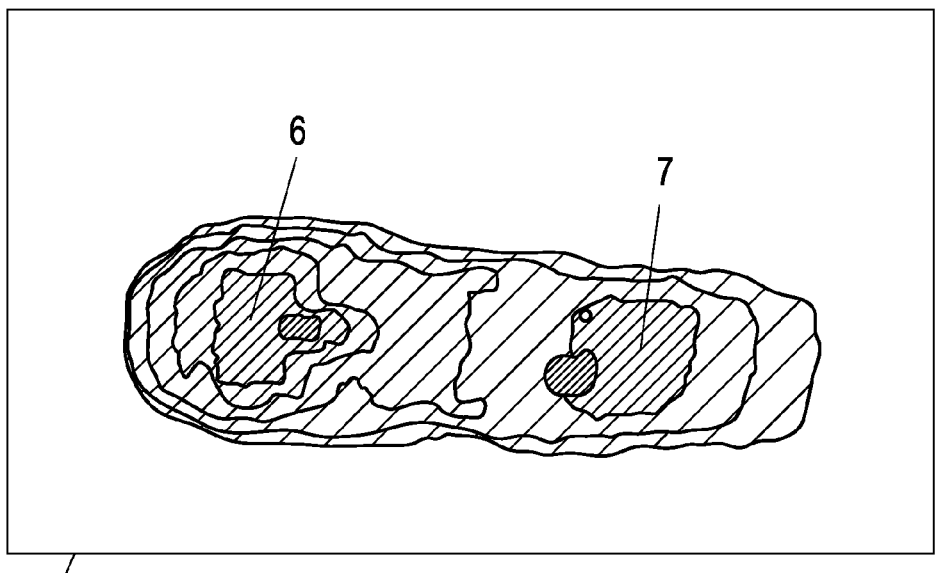

The rectification by the angle of aperture α (and β) can be carried out both directly on the height profiles $W_{2.5}$, $W_2$, and already beforehand on the movement vector image V. This is shown in FIG. 3b, which shows the movement vector image V of FIG. 3a after the step of rectification by the angles of aperture α, β; the rectified movement vector image is denoted by V'. A rectified 2.5D height profile $W_{2.5}$' or a rectified 2D height profile $W_2$' may thus also be created directly from the rectified movement vector image V' of FIG. 3b.

The height profiles $W_{2.5}$, $W_{2.5}$', $W_2$, $W_2$' may then be used for classification of the vehicle 2, for example in that significant parameters of the vehicle 2, such as height and length, are calculated therefrom or the height profiles are compared with a set of previously stored reference height profiles of known vehicle classes.

If the inherent speed v of the vehicle 2 is known, for example as a result of measurement by means of separate sensors, such as photoelectric sensors, induction loops in the carriageway 1, scanners etc., it can be included directly in the optical flow analysis of FIG. 2a, and the movement vector images V, V' and height profiles $W_{2.5}$, $W_{2.5}$', $W_2$, $W_2$' contain absolute values, that is to say are scaled, such that, for example, the correct height and length of the vehicle 2 can be deduced therefrom. If the inherent speed v of the vehicle 2 is not known or is measured separately, in particular if only a single camera 4 is provided for carrying out the described optical flow method, a lowest moving point $P_3$ that is to say a point farthest from the camera, or a shadow of the vehicle 2 on the road 1, can be used in the images $F_1$, $F_2$ as a reference value, and the movement vector image V, V' or the height profiles $W_{2.5}$, $W_{2.5}$', $W_2$, $W_2$' can be referenced and thus scaled. A shadow of the vehicle 2 on the road 1, for example an outermost point of this shadow, could also be detected in the images $F_1$ and $F_2$ and used for speed measurement in order to then scale the height profiles $W_{2.5}$, $W_{2.5}$', $W_2$, $W_2$'.

Alternatively, the moments in time $t_2$, $t_1$ at which the two analysed images $F_1$, $F_2$ are recorded may be selected beforehand such that they correspond to predetermined positions of the vehicle 2 on the road 1. For example, with the aid of wheel detectors $D_1$, $D_2$ integrated into the carriageway, for example induction loops, photoelectric sensors, scanners, etc., but also by means of an evaluation of the continuous images (of the video stream) of the camera 4 itself, those two moments in time $t_1$, $t_2$ at which the vehicle 2 adopts the two locations or positions shown in FIG. 1a by solid and dashed lines can thus be detected so as to then record the images $F_1$, $F_2$. The height profiles $W_{2.5}$, $W_{2.5}$', $W_2$, $W_2$' are thus scaled automatically with the correct speed.

Of course, a height profile $W_{2.5}$, $W_{2.5}$', $W_2$, $W_2$' of a plurality of vehicles in the field of vision of the camera 4 can also be created with the method.

CONCLUSION

The invention is therefore not limited to the presented embodiments, but includes all variants and modifications that fall within the scope of the accompanying claims.

What is claimed is:
1. A method for measuring a height profile of a vehicle passing on a road, the height profile comprised of object points, comprising:

directing a monocular camera with an image recording sensor having a square or rectangular image recording plane from a point above the road in an invariant direction onto the road with an angle of aperture, wherein the camera two-dimensionally captures, over said angle of aperture, a section of the road from above;

recording at least a first image of the passing vehicle by the camera at a first moment in time, the first image being two-dimensional in said image recording plane and comprising a first plurality of image points;

recording at least a second image of the passing vehicle by the camera at a second moment in time, the second image being two-dimensional in said image recording plane and comprising a second plurality of image points;

generating a movement vector image comprised of movement vectors from an optical flow analysis of an optical flow between the first image and the second image; and creating the height profile of the vehicle from the movement vector image by considering that image points of the vehicle's object points which pass closer to the camera have larger movement vectors in the movement vector image than image points of the vehicle's object points which pass more distant from the camera.

2. The method according to claim 1, wherein the camera is directed substantially vertically downwardly onto the road.

3. The method according to claim 1, wherein the height profile is a 2.5D height profile.

4. The method according to claim 1, wherein the height profile is a 2D height profile, which runs parallel to a longitudinal direction of the road.

5. The method according to claim 1, wherein the height profile is scaled on the basis of a speed of a lowest recorded point of the vehicle or on the basis of a shadow of the vehicle on the road.

6. The method according to claim 1, wherein the first moment in time is a moment in time at which the vehicle is detected in a first position on the road, and the second moment in time is a moment in time at which the vehicle is detected in a second position on the road.

7. The method according to claim 6, wherein the vehicle is detected in the first and the second position with the aid of sensors arranged at the road or by an evaluation of images of the camera.

8. The method according to claim 1, comprising rectifying the movement vector image for compensation of the angle of aperture, before the height profile is created therefrom.

9. The method according to claim 1, comprising rectifying the height profile for compensation of the angle of aperture.

10. The method according to claim 1, wherein a total variation optical flow method is used for the analysis of the optical flow.

11. The method according to claim 1, comprising classifying the vehicle on the basis of a comparison of the created height profile with reference height profiles of known vehicle classes.

12. The method according to claim 1, wherein a traffic monitoring camera mounted above the road is used as the camera.

13. The method according to claim 1, wherein said generating the movement vector image comprises detecting significant image points in the first image and in the second image and establishing movement vectors of said significant points.

14. The method according to claim 13, wherein the height profile is scaled on the basis of a speed of a lowest recorded point of the vehicle or on the basis of a shadow of the vehicle on the road.

15. The method according to claim 13, comprising rectifying the movement vector image for compensation of the angle of aperture, before the height profile is created therefrom.

16. The method according to claim 13, comprising rectifying the height profile for compensation of the angle of aperture.

17. The method according to claim 1, wherein said generating the movement vector image comprises minimising an objective function comprising movement vectors of all image points in the first image and in the second image to establish the movement vectors which best reflect the change of the optical flow.

18. The method according to claim 17, wherein the height profile is scaled on the basis of a speed of a lowest recorded point of the vehicle or on the basis of a shadow of the vehicle on the road.

19. The method according to claim 17, comprising rectifying the movement vector image for compensation of the angle of aperture, before the height profile is created therefrom.

20. The method according to claim 17, comprising rectifying the height profile for compensation of the angle of aperture.

21. The method according to claim 17, wherein a total variation optical flow method is used for the analysis of the optical flow.

* * * * *